D. W. HAWKSWORTH.
RUNNING BOARD SADDLE.
APPLICATION FILED MAR. 11, 1920.
1,385,618.
Patented July 26, 1921.
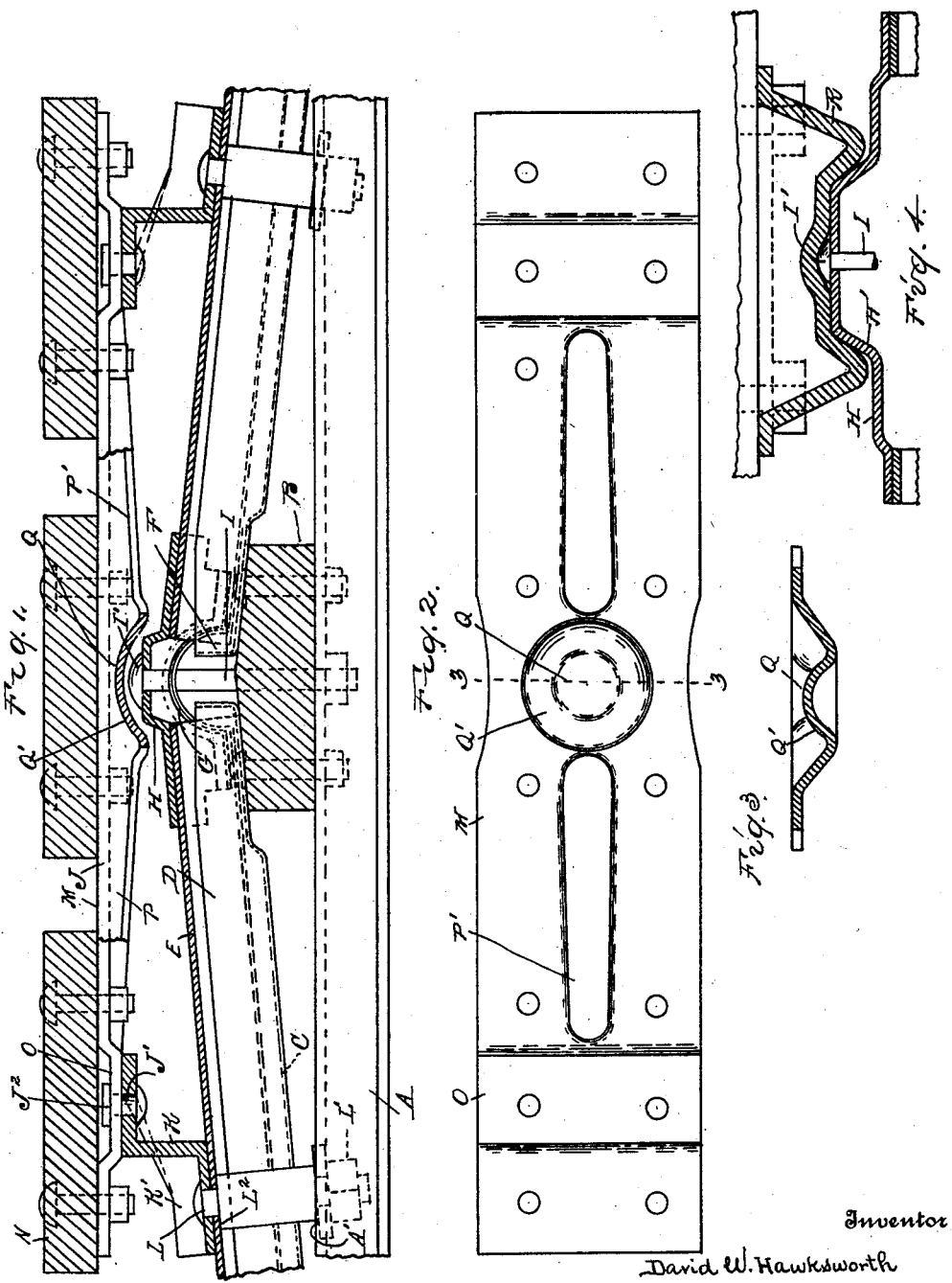
Inventor
David W. Hawksworth
By Whittemore Hulbert & Whittemore
Attorneys

UNITED STATES PATENT OFFICE.

DAVID W. HAWKSWORTH, OF DETROIT, MICHIGAN, ASSIGNOR TO HUTCHINS CAR ROOFING COMPANY, OF DETROIT, MICHIGAN, A CORPORATION OF MICHIGAN.

RUNNING-BOARD SADDLE.

1,385,618.     Specification of Letters Patent.     Patented July 26, 1921.

Original application filed August 30, 1918, Serial No. 252,001. Divided and this application filed March 11, 1920. Serial No. 364,942.

*To all whom it may concern:*

Be it known that I, DAVID W. HAWKSWORTH, a citizen of the United States of America, residing at Detroit, in the county of Wayne and State of Michigan, have invented certain new and useful Improvements in Running-Board Saddles, of which the following is a specification, reference being had therein to the accompanying drawings.

The invention relates to car roofs and is particularly adapted for use in car roofs of that type in which the roofing sheets are weather proofed by carline and ridge caps, which are in turn weather proofed by junction caps held in place by bolts having their heads extended thereabove. One of the objects of the invention is to obtain a simple construction of running board saddle which will weather proof the head of the bolt extending above the junction cap so that any water falling upon the running board saddle will be discharged without the confines of the bolt head. Other objects of the invention reside in the novel arrangements and combinations of parts as more fully hereinafter set forth. This application is a division of my prior application, Serial No. 252,001, filed Aug. 30, 1918, for car roof.

In the drawings:

Figure 1 is a transverse sectional view through a portion of the car roof, with the running board saddle embodying my invention applied;

Fig. 2 is a plan view of the running board saddle;

Fig. 3 is a sectional view on line 3—3 of Fig. 2;

Fig. 4 is a similar view of a modified construction.

A are the carlines; B is the ridge purlin arranged upon the carlines centrally thereof; and C are the relatively-movable roofing sheets having the upstanding flanges D at their sides which are weather proofed by the carline caps E and also provided with the upstanding flanges F at their ridge, which are weather proofed by the ridge caps G. H are the junction caps fitting upon the adjacent ends of the carline and ridge caps E and G respectively for weather proofing the car roof, and I are the bolts for securing the junction caps to the carlines, the bolts extending centrally through the ridge purlin B and having the exposed heads I' extend above the junction caps.

J are the running board saddles arranged in the planes of the carline caps and rigidly connected near opposite ends to the carlines A by the Z-shaped brackets K formed of pressed sheet metal and having the reinforcing side flanges K'. The shoulder bolts L extend at right angles to the base flanges of the brackets K and the inclined shoulders A' upon the carlines A and are engaged at their lower ends by the nuts L' to secure the brackets rigidly in place. The upper shoulders $L^2$ upon the shoulder bolts fit tightly upon the carline caps E and maintain these caps and also the brackets K in fixed spaced relation relative to the carlines A. With this construction each running board saddle forms a truss for the central portion of the carline inasmuch as its ends are rigidly connected to the carlines at spaced points upon opposite sides of the ridge purlin.

With the above construction the assembly of the car roof is also greatly facilitated since the carline caps E, the brackets K and the bolts L can be assembled and secured permanently together prior to the complete assembly of the car roof.

The saddles J are pressed from sheet metal to provide plain surface portions for supporting the running-boards and to provide weather-proofing means for the exposed heads I' of the junction cap bolts I. In detail, each saddle has the horizontally-extending portion M for supporting the running-boards N and is also provided with the depressed transversely-extending channels O which provide sufficient space beneath the running-boards for the nuts $J^2$ of the bolts J' securing the saddle to the brackets K. Extending longitudinally and centrally inward from the depressed channels O are the depending ribs P, which are inclined downwardly toward the center and at their inner ends inclined sharply downward and terminate in the concavo-convex cap portion Q adapted to surround and embrace the exposed head I' of the bolt I to weather proof the same. The depending ribs P are formed by striking out the longitudinal central portions of the saddle, which also forms the elongated openings P' intermediate these depending ribs. With this arrangement the running board saddle is greatly reinforced and, furthermore, any moisture, cinders, or other materials which would collect upon the saddles are free to pass through the openings and off the saddles.

The cap portion Q of the running board saddle has the sides Q' extending down about the exposed head I' of the junction cap bolt to a point therebelow so that the exposed head is embraced thereby and weather proofed and any moisture dropping upon the cap portion will be discharged therefrom without the confines of the head.

In the modified construction, as shown in Fig. 4, the running-board saddle R fits upon the centrally upwardly extending portion H' of the junction cap H and over the exposed head I' of the bolt I so that the running board saddle assists the bolt in maintaining the junction cap in place and, furthermore, effectually weather proofs the bolt.

What I claim as my invention is:

1. A running board saddle having a concavo-convex portion embracing the head of a junction cap bolt to weather proof the same.

2. A running board saddle having a concavo-convex portion embracing the head of a junction cap bolt, the sides of said concavo-convex portion extending around and below the plane of the bolt held to weather proof the same.

3. A running board saddle having a concavo-convex portion embracing the head of a junction cap bolt the sides of said portion extending around and below the plane thereof, and also having longitudinally-extending apertures therethrough terminating at the bottom of the sides of said concavo-convex portion.

4. A running board saddle formed of pressed sheet metal having a plain surface portion for supporting the running board of the car roof, and a depressed cap portion for embracing the head of a junction cap bolt to weather proof the same.

5. A running board saddle formed of pressed sheet metal having a plain surface portion for supporting a running board of a car roof, reinforcing ribs extending longitudinally thereof, and a concavo-convex cap portion for embracing the head of a junction cap bolt to weather proof the same.

In testimony whereof I affix my signature.

DAVID W. HAWKSWORTH.